US006764187B2

(12) United States Patent (10) Patent No.: US 6,764,187 B2
Ryutov et al. (45) Date of Patent: Jul. 20, 2004

(54) UNIVERSALLY ORIENTED RENEWABLE LIQUID MIRROR

(75) Inventors: Dmitri D. Ryutov, Livermore, CA (US); Arthur Toor, Waldport, OR (US)

(73) Assignee: The Regents of the University of California, Oakland, CA (US)

( * ) Notice: Subject to any disclaimer, the term of this patent is extended or adjusted under 35 U.S.C. 154(b) by 252 days.

(21) Appl. No.: 10/028,411

(22) Filed: Dec. 19, 2001

(65) Prior Publication Data

US 2002/0135908 A1 Sep. 26, 2002

Related U.S. Application Data

(60) Provisional application No. 60/258,192, filed on Dec. 22, 2000.

(51) Int. Cl.[7] .................................................. G02B 5/08
(52) U.S. Cl. ........................ 359/846; 359/845; 359/884; 372/34; 372/107
(58) Field of Search .................... 359/845, 846, 359/884; 372/34, 107

(56) References Cited

U.S. PATENT DOCUMENTS

| | | | |
|---|---|---|---|
| 3,653,742 A | | 4/1972 | Buchan |
| 4,190,327 A | * | 2/1980 | Hughes ..................... 350/310 |
| 4,909,626 A | | 3/1990 | Purvis et al. |
| 4,958,919 A | | 9/1990 | Sigler |
| 5,033,831 A | | 7/1991 | Sigler |
| 5,532,880 A | | 7/1996 | Robb |
| 5,650,880 A | | 7/1997 | Shuter et al. |
| 5,687,022 A | | 11/1997 | Robb |

OTHER PUBLICATIONS

Ragazzoni, et al., "A liquid adaptive mirror," Astronomy and Astrophysics, 283, L–17–L–19 (3 pages) (1994).
Ragazzoni, et al., "Electromagnetic driven liquid mirrors," SPIE vol. 2263, pp. 379–385 (7 pages) (1994).
Hong, et al., "Magneto–chromatic effects of tunable magnetic fluid grating," Journal of Applied Physics, vol. 83, No. 11, pp. 6771–6773 (3 pages) (Jun. 1, 1998).
Horng, et al., "Magnetochromatics resulted from optical gratings of magnetic fluid films subjected to perpendicular magnetic fields," Journal of Applied Physics, vol. 88, No. 10, pp. 5904–5908 (5 pages)(Nov. 15, 2000).
Ryutov, et al., "Optical elements based on the use of renewable liquid films with magneto–electrostatic control," review of Scientific Instruments, vol. 72, No. 11, pp. 4042–4054 (13 pages), Nov. 2001.
Toor, et al., "renewable liquid zone plate for 8 keV X rays," UCRL–JC–141769–ABS, Lawrence Livermore National Laboratory, (2 pages) (2000).

* cited by examiner

Primary Examiner—Audrey Chang
Assistant Examiner—Craig Curtis
(74) Attorney, Agent, or Firm—Eddie E. Scott; Alan H. Thompson (57) ABSTRACT

A universally oriented liquid mirror. A liquid and a penetrable unit are operatively connected to provide a mirror that can be universally oriented.

44 Claims, 7 Drawing Sheets

UNIVERSALLY ORIENTED RENEWABLE LIQUID MIRROR

CROSS-REFERENCE TO RELATED APPLICATIONS

This application claims the benefit of U.S. Provisional Application No. 60/258,192, filed Dec. 22, 2000, and entitled "Renewable Thin-Liquid-Film Reflecting Apparatus," which is incorporated herein by this reference. U.S. patent application Ser. No. 10/027,722, filed Dec. 19, 2001 entitled "Renewable Thin-Liquid-Film Reflection Grating" and U.S. patent application Ser. No. 10/028,418, filed Dec. 19, 2001 entitled "Renewable Thin Film Liquid Reflecting Zone Plate" describing related inventions are being filed simultaneously with this application. This specification, drawings, and disclosure of U.S. patent application Ser. No. 10/027,722, filed Dec. 19, 2001 entitled "Renewable Thin-Liquid-Film Reflection Grating" and U.S. patent application Ser. No. 10/028,418, filed Dec. 19, 2001 entitled "Renewable Thin Film Liquid Reflecting Zone Plate" are incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to mirrors and more particularly to a universally oriented liquid mirror.

2. State of Technology

An arbitrarily oriented mirror is an important element of an optical system. It allows an arbitrary transformation of a light beam. There exist high quality solid mirrors, both planar and shaped which can be arbitrarily oriented in the gravity field. However, in applications where one deals with high-power pulses of radiation these mirrors will be damaged and would require replacement after every pulse, introducing significant operational expenses. There exists also planar and parabolic (rotating) liquid mirrors, as well as liquid mirrors controlled by j×B forces, but these mirrors are suitable only for a specific ("face up") orientation in the gravity field.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a universally oriented liquid mirror. The mirror comprises a liquid and a penetrable unit. A system operatively connects the liquid to the penetrable unit to provide a mirror that can be universally oriented.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Figure 1:
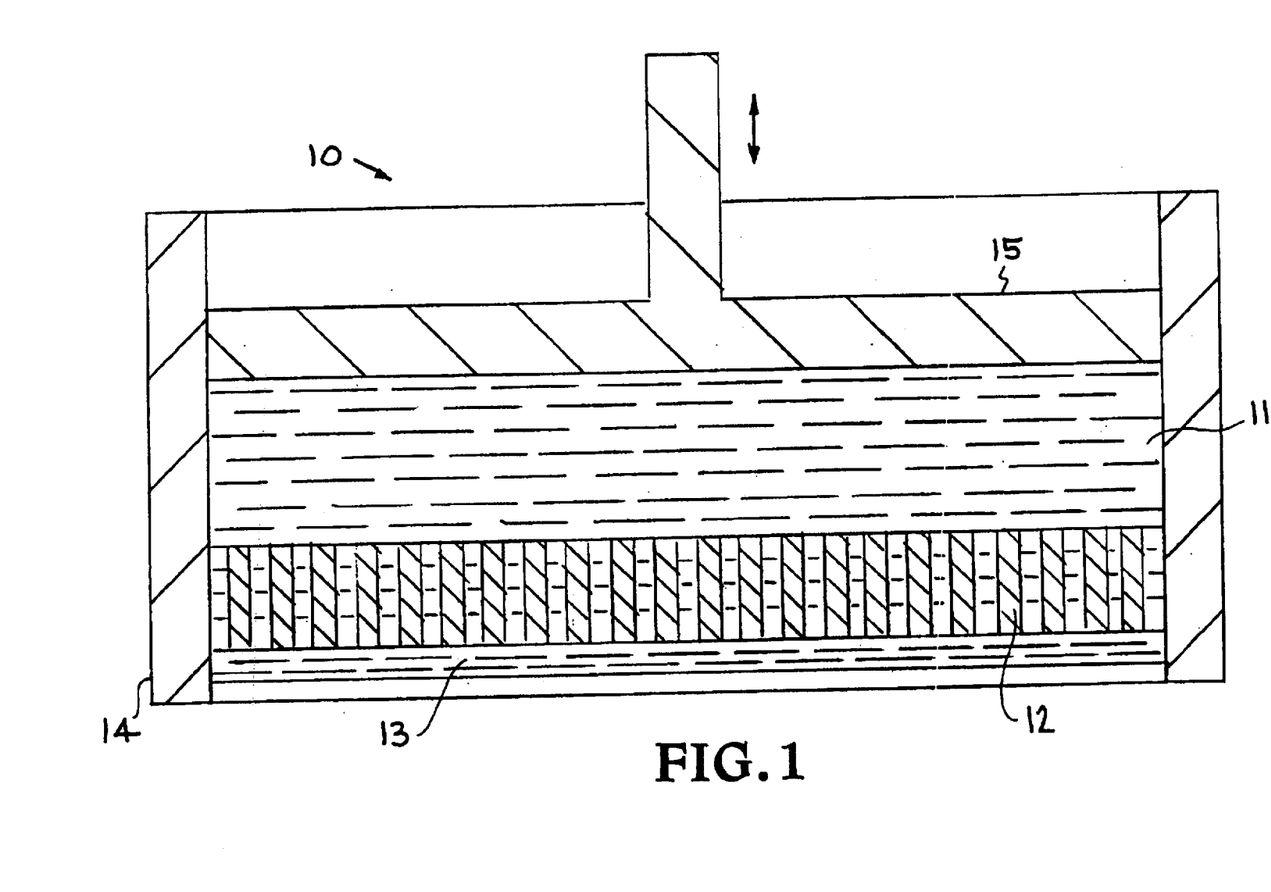
FIG. 1 illustrates an embodiment of a planar renewable mirror system.

Referring now to FIG. 1, an embodiment of a system incorporating the present invention is illustrated. The system is generally designated by the reference numeral 10. The system 10 is a planar renewable universally oriented liquid mirror. The planar renewable mirror system is shown with an upside-down orientation in FIG. 1. The universally oriented liquid mirror 10 includes a liquid 11 contained by a porous unit 12. The porous unit 12 maintains operability of the liquid mirror 10 in all orientations.

The liquid film planar renewable mirror system 10 illustrated in FIG. 1 will now be described in greater detail. A system for creating liquid mirrors for X-ray and optical wavelengths that can be arbitrarily oriented with respect to gravity is provided and used to produce the liquid film planar renewable mirror 10. The system uses a porous substrate 12, ~1 mm thick. A piston 15 presses the working fluid through the substrate, creating a liquid film with a thickness, which is a few times the diameter of the characteristic pore size. Capillary forces in combination with viscous damping smooth all small-scale non-uniformities and create a surface of an optical quality. After the passage of the optical pulse, the film is pulled back by reversing the piston and the same sequence is repeated. The time for the in-out motion of the fluid will be shorter than the time for the film to flow under the action of gravity. For the "upside-down" configuration, the in-out time must be also shorter than the e-folding time for long-wavelength, Rayleigh-Taylor unstable perturbations. For centimeter-size mercury mirrors, 30 micron thick, the in-out time can be as long as 0.1 s. By shaping the surface of the porous substrate, one can create curved mirrors. In some configurations, the gravity-driven flow can be suppressed by driving the current through the film and stopping the gravity-driven flow by the J×B force.

The mirror 10 is particularly useful in situations where a conventional mirror would experience problems. The 3rd generation light sources, such as the Advanced Photon Source at Argonne National Laboratory, are capable of providing sufficient dose to optical components to create permanent damage. Such damage will cause operational limitation that must be overcome to realize the potential of the 4th generation light sources that are in the planning process both in U.S. and Germany. The liquid mirror provides the unique feature of renewing the optical surface in situ between successive intense light or x-ray pulses. Other applications include the using the renewable liquid mirror as an element of optical diagnostics in high-energy-density experiments, like the National Ignition Facility at Lawrence Livermore National Laboratory, Z facility at Sandia, and others, where these mirrors could be placed much closer to the point of the energy release than conventional solid-state mirrors. Systems where damage to the optical elements is a serious design constraint, include also rep-rate lasers for commercial applications.

Referring again to FIG. 1, the liquid film 13 is formed by pressing a working liquid 11 through a porous substrate 12 by a piston 15. The working liquid 11 shown in FIG. 1 is mercury. In other embodiments of the invention the working fluid is composed of other materials that provide reflectivity. The working fluid in other embodiments can be conducting liquids including Gallium; NaK alloy (40 to 90% of K). The working fluid in other embodiments can be dielectric liquids including various alcohols, from ethyl alcohol $C_2H_6O$ to benzyl alcohol $C_7H_8O$; glycerin; heavy hydrocarbons, like $C_9H_{20}$.

The piston 15 moves within a cylinder 14. Before the gravitational instability has developed, the piston 15 sucks the liquid 13 back, and the cycle repeats. In the embodiment shown, the substrate 12 is made of fused capillaries of the same radius $r_{cap}$. In other embodiments, different porous substrates 12 can be used. In other embodiments, the system operates to push and pull the liquid not by a piston, but by a flexible membrane driven by actuators situated behind it.

The embodiment illustrated in FIG. 1 presents a new class of centimeter-size renewable optical elements consisting in most cases of thin liquid films over porous substrates, which can be used in a rep-rate mode. Between two successive pulses the optical elements can be created anew. The film thickness of the system 10 is in the range from a few microns to a hundred of microns. The film behavior is strongly affected by capillary forces. Electrostatic, j×B, and capillary forces are used to control the shape of the surface of the film 13. Optical elements, in most cases, can be arbitrarily oriented with respect to the gravitational force. The acronym "CAMEL"—CApillary-Magneto-ELectrostatic"is used to designate this new class of optics.

The word "capillary" as used herein in two senses. First, it is used as a noun, to designate a thin channel in a solid material. Second, following a long tradition, it is used as an adjective, to designate short-wavelength perturbations on the free surface of the liquid ("capillary waves"). The restoring force for this type of waves is provided by surface tension sometimes called a "capillary force," whence the "capillary waves."

Renewing an optical element after each pulse has particular utility in developing optics for the fourth-generation light sources, such as LCLS and XFEL, where extremely intense beams of 8–10 keV photons will be generated. In the LCLS facility, for example, the flux of the 8-keV photons will be up to $1.4 \cdot 10^{14}$ W/cm$^2$ within a 250 fs pulse, with total fluence during the pulse reaching 40 J/cm$^2$. Such fluences may cause a serious damage to materials that can be used as mirrors, lenses, diffraction gratings, and other optical elements. The pulses will follow at a frequency ~100 Hz. Therefore, if these high-fluence beams are used without their preliminary significant attenuation, it is necessary to come up with some concept that will allow replacing optical elements after each pulse. In our approach, these elements are created anew after each pulse, on the surface of a liquid, without causing any damage to permanent structures.

The CAMEL optics provide qualitatively new and important features and can become the enabling technology for a broad variety of applications, many of which are difficult to foresee at this time. Some of the CAMEL optics applications include:

1) Renewable X-ray optics for ultra-intense x-ray free electron lasers (the needs of LCLS initially stimulated us to consider pulse-to-pulse renewable capillary diffraction gratings and gave rise to the first steps in the analysis of the CAMEL concept);
2) Renewable optics for pulsed and rep-rate high-power lasers at longer wavelengths, including the visible and infrared range.
3) Configurations used to create adaptive optics for steady-state low-intensity sources.

CAMEL optics for rep-rate applications allows one to monitor and change the parameters of the optical system between two successive pulses at a frequency of ~100 Hz.

Engineering equations required for design of the CAMEL optics are provided below.

Basic Notations Used In Description

In the general equations we use the CGS system of units. In "practical" estimates we use mixed units specified in each case.

a—distance of the conducting ring from the film surface
b—thickness of the substrate
c—speed of light
g—gravitational acceleration
h—thickness of a liquid film
k—wave number of perturbations
k*—critical wave number (Equation (2.2)
$r_{cap}$—inner radius of the capillary
B—magnetic field strength
$C_p$—thermal capacity per unit volume $D_m$—magnetic diffusivity
E—(1) electric field strength, and (2) Young's modulus for the substrate
R—(1) radius of a mirror, and (2) radius of an electrically charged ring
S—sound speed
U—voltage applied between the conducting ring and working liquid
α—capillary constant
β—volumetric thermal expansion coefficient
Δb—deformation of the substrate
Δh—(1) variation of the film thickness, and (2) thickness of the film layer heated by the laser
$κ_B$—Boltzmann constant
η—filling factor of the substrate (a fraction of the surface occupied by capillary holes)
λ—spatial period of the diffraction grating
$λ_x$—wavelength of x-ray radiation (or, generally, of the incident light)
ν—kinematic viscosity
ξ—displacement of a liquid element in the perturbation
ρ—liquid density
σ—electrical conductivity
τ—viscous dissipation time (Equation (8))
X—thermal diffusivity
ω—frequency of surface waves
$ω_{vibr}$—frequency of vibrations of mechanical structure Although there exists a large variety of liquids suitable for the CAMEL optics, the numerical estimates set out herein only apply to one liquid, namely mercury. Parameters of the mercury required for discussion are listed in Table 1. In cases where we discuss dielectric liquids we assume that their dielectric constant is not much greater than 1ε−1~1.

TABLE 1

Room Temperature Parameters for Mercury

| | |
|---|---|
| Density | $ρ = 13.6$ g/cm$^3$ |
| Kinematic viscosity | $υ = 1.2 \times 10^{-3}$ cm$^2$/s |
| Electrical conductivity | $σ = 1 \times 10^{16}$s$^{-1}$ |
| Magnetic diffusivity | $D_m = 3.5 \times 10^{-3}$ cm$^2$/s |
| Thermal diffusivity | $χ = 2.7 \times 10^{-2}$ cm$^2$/s |
| Surface tension | $α = 500$ erg/cm$^2$ |
| Thermal capacity | $c_p = 1.9 \times 10^7$ erg/cm$^3$K |
| Sound speed | $S = 1.5 \times 10^5$ cm/s |
| Volumetric thermal expansion coefficient | $β = 1.8 \times 10^{-4}$ K$^1$ |

Properties of Capillary Waves

Numerous studies on the theory of capillary waves exist. For the purpose of this application, however, a somewhat "non-traditional" slice of this theory, which cannot be found in one single publication, is needed. Therefore, this section is included. In all the numerical examples we will consider the mercury.

Ideal Liquid

Figure 2:
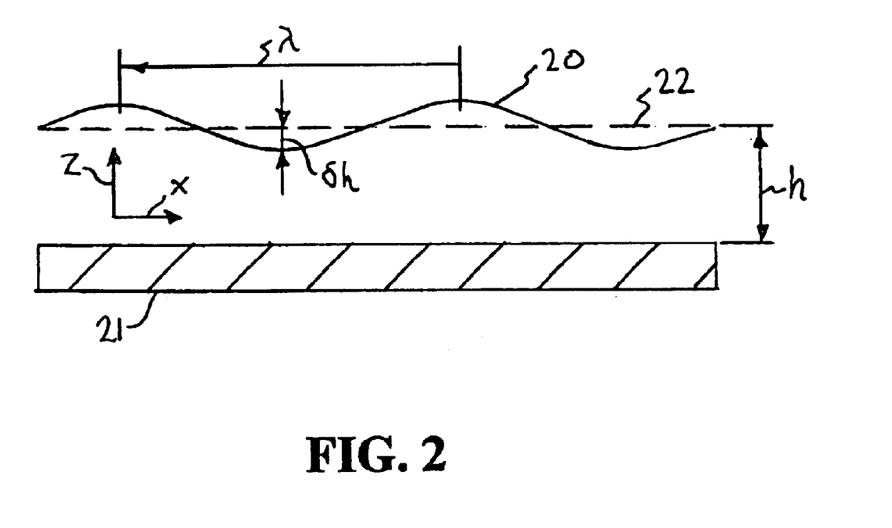
FIG. 2 shows a liquid film over a solid substrate.

Referring now to FIG. 2 a layer of a liquid 20 resting on a planar underlying surface 21 is shown. The substrate 21 is shaded. The surface of the film 20 is rippled at a wavelength λλ=2π/k. Dashed line 22 represents unperturbed surface of the film 20; δh is the amplitude of the surface perturbation.

The dispersion relation for a small-amplitude wave propagating over this surface is:

$$ω^2 = \left(kg + \frac{αk^3}{ρ}\right)\tanh(kh) \quad \text{(Equation 1)}$$

The first term in the bracket in Equation 1 describes a contribution of gravity to the restoring force; the second term describes the contribution of surface tension. These two terms become equal at k=k*, where $$k^* = \sqrt{\frac{gρ}{α}} \quad \text{(Equation 2)}$$

For mercury, this critical wave number is k*≈5 cm$^{-1}$ and corresponds to the wavelength of 1.2 cm.

Figure 3:
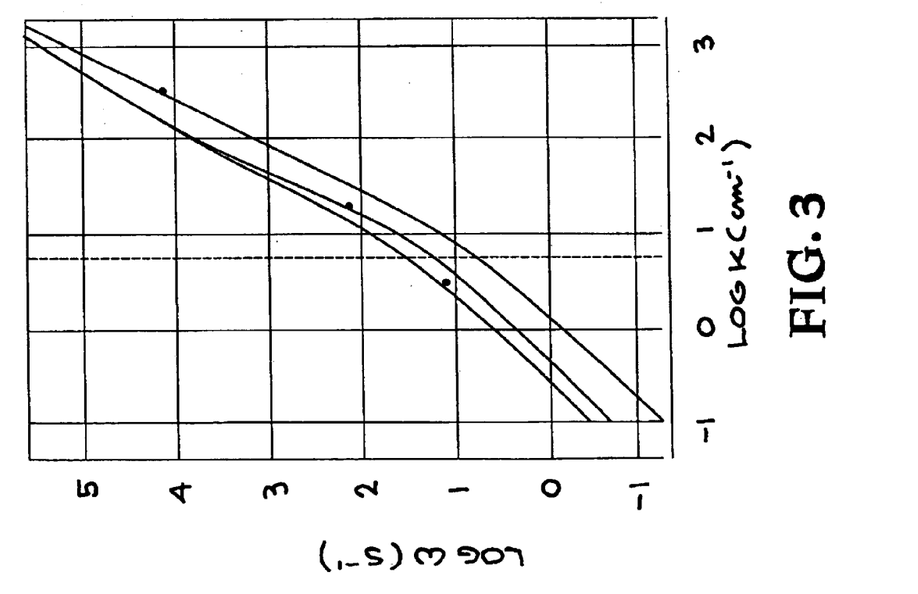
FIG. 3 depicts dispersion curves for capillary oscillations of mercury film of various depths.
Figure 4:
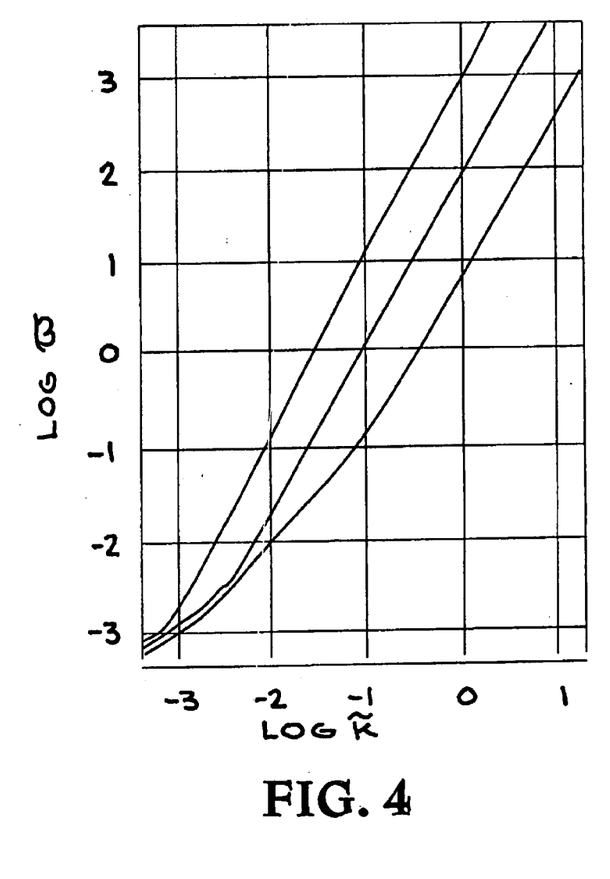
FIG. 4 depicts dispersion relation presented in the dimensionless form.

FIGS. 3 and 4 show dispersion properties of surface waves in the setting of FIG. 1. FIG. 3 shows dispersion curves for the mercury; curves, from the lower to the upper one, correspond to film thickness of 3 μm, 30 μm, and 100 μm, respectively; the dots show the points where the condition ωτ=1 is satisfied, where τ is defined by equation 8; to the lhs of the dots, the waves are strongly damped with the damping rate defined by equation 9. Dashed vertical line is the line where k=k*.

FIG. 4 depicts dispersion relation for an arbitrary fluid presented in the dimensionless form, with ω measured in units of $(h/g)^{1/2}$, and k measured in units of 1/h (ω̃=ω√h/g, k̃=kh). In these units the dispersion relation (1) reads:

$$ω̃^2 = k̃\left[1 + \frac{k̃^2}{(k*h)^2}\right]\tanh k̃ \quad \text{(Equation 1')}$$

Curves from the lower to the upper, correspond to the parameter k*h equal to $10^{-1}$, $10^{-2}$, and $10^{-3}$ respectively.

For short wavelengths, kh>1, the perturbation is localized near the free surface, and decays exponentially with the distance from the surface, with the e-folding length being 1/k. The dispersion relation for such perturbations reads as:

$$ω^2 = \left(kg + \frac{αk^3}{ρ}\right) \quad \text{(Equation 3)}$$

For these short waves, parallel and perpendicular (to the surface) displacements of liquid elements are of the same order of magnitude.

Long-wavelength perturbations, with kh<1, occupy the whole layer. The parallel to the surface displacements of liquid elements ($ξ_∥$) are in this case much greater than perpendicular displacements ($ξ_z$). These displacements are:

$$ξ_z = z\frac{δh}{h}\cos(kx - ωt); \quad ξ_∥ = \frac{δh}{kh}\sin(kx - ωt), \quad \text{(Equation 4)}$$

where δh is the amplitude of the vertical displacement of the surface. The parallel component is independent of z (up to higher-order corrections in the parameter kh). As is clear from Equation (4), $ξ_∥$~δh/>>δh. The dispersion relation for long-wavelength (kh<1) perturbations is $$ω^2 = \left(kg + \frac{αk^3}{ρ}\right)kh \quad \text{(Equation 5)}$$

The dispersion relation (1) describes also gravitational instability of the liquid film turned "upside down" so that the substrate is now at the top. Dispersion relation in this case can be formally obtained from (1) by reversing the sign of g, $$\omega^2 = \left(-kg + \frac{\alpha k^3}{\rho}\right) \tanh(kh) \quad \text{(Equation 6)}$$

Perturbations are stable (($\omega$ real) for short-enough wavelengths, k>k*, and unstable otherwise.

Compressibility of the liquid is unimportant, because the phase velocity is typically much smaller than the sound velocity S. Indeed, for the mercury the phase velocity, $\sqrt{\alpha k/\rho}$, becomes formally greater than S only for unrealistically large k, k>5·10$^8$ cm$^{-1}$.

Viscous Effects

Viscosity causes damping of stable perturbations. It cannot stabilize unstable perturbations with (k<k*) in the case of inverted geometry but, in some cases, can reduce their growth rate.

In the case of short wavelengths, kh>1, the damping rate Im$\omega$ is equal to:

$$\text{Im}\omega = -2\nu k^2 \quad \text{(Equation 7)}$$

For long wavelengths, kh<1, the damping rate depends on the parameter $\omega\tau$, where $\tau$ is a characteristic time for viscous shear flow to propagate over the film thickness h, $$\tau \equiv \frac{h^2}{\nu} \quad \text{(Equation 8)}$$

For a mercury film with h=25·m, one has $\tau$=5.2·10$^{-3}$ s.

We will need the damping rate only for the case of small $\omega\tau$. In this domain, perturbations become essentially aperiodic, with Im$\omega$>>Re$\omega$, and $$\text{Im}\omega \approx -\frac{h^3 k^2}{3\nu}\left(g + \frac{\alpha}{\rho}k^2\right) \quad \text{(Equation 9)}$$

For the inverted configuration, and wavelengths with k<k*, the system is unstable, with the growth rate being $$\text{Im}\omega = \frac{h^3 k^2 g}{3\nu}\left(g - \frac{\alpha}{\rho}k^2\right) \quad \text{(Equation 10)}$$

Creating a Liquid Film by Pressing a Liquid Through a Porous Substrate

General Approach

Referring to FIG. 1, the use of wettable and non-wettable substrates 12 is possible. The use of a non-wettable substrate would probably allow a complete removal of the liquid from the outer side of the system during the "in" move of the piston. A mechanical barrier (a rim) of the height approximately equal to the film thickness could be used to prevent the film from spreading laterally. For non-wettable substrate, the pressure in the liquid will be non-negative, so that there will be no concern about cavitation. A wettable substrate (with a non-wettable rim) is also conceivable. However, for the wettable substrate, one can expect that droplets will stick to the areas between the holes of the capillaries and the liquid will not be completely removed from the surface after every pulse. During the "in" motion of the piston, a negative pressure will develop, thereby creating a possibility of cavitation. On the other hand, the droplets will be absorbed by the liquid during the next pulse, and flat surface will be formed again; also, the negative pressures developing during the "in" move are small and shouldn't lead to cavitaiton in a liquid of a normal purity. And, the wettable substrate would allow production of thinner films, with a thickness less than the size of capillaries.

Referring again to FIG. 1 one cycle of the motion of the piston will be described. Starting from the position where the liquid film 13 is present on the outer surface of the porous substrate 12. The piston 15 begins moving away from the substrate 12 and, by the end of a half-cycle, "sucks" the liquid 11 out of the capillaries into the volume behind the substrate 12. On the reverse motion, the piston 15 presses the liquid 11 through the capillaries and creates a liquid film 13 with a high-quality reflecting surface. The stroke of the piston 15 is equal to the thickness b of the substrate (plus the film thickness, which is usually negligible compared to b). It may suffice to have a stroke as small as a few thicknesses (h) of the liquid film. We, however, will discuss a more difficult in realization case of a larger stroke. This larger stroke may be necessary if one wants to extract all the working liquid from the capillaries during every cycle. A continuing lateral flow of the working liquid through a plenum behind the substrate could then be organized to gradually refresh it. A cleaning system can be introduced in this contour.

In one embodiment it is a porous unit. In another embodiment it is a porous substrate. In another embodiment it is a capillary substrate. In another embodiment it is planar. In another embodiment it is contoured. In another embodiment it is a figured porous substrate. In another embodiment it comprises holes extending through said penetrable unit. In another embodiment it the holes are capillary size holes.

Deformations of the Substrate

In order to provide a smoothest possible surface of the mirror, the radius of capillaries, $r_{cap}$, must be made as small as possible. On the other hand, the pressure required to push the liquid through capillaries, $\Delta p$, increases as $1/r_{cap}$:

$$|\Delta p| = \frac{2\alpha}{r_{cap}}. \quad \text{(Equation 11)}$$

For wettable materials one would have to apply a negative $\Delta p$ to suck the liquid out of the capillary. When making the estimate (11), we considered perfectly non-wettable or perfectly wettable material, with the contact angle being either 180° or 0°. The pressure $\Delta p$ applied to the substrate causes its deformation, which we will evaluate in this sub-section.

For the mercury, $$\Delta p(atm) \approx \frac{10}{r_{cap}(\mu m)}. \quad \text{(Equation 12)}$$

It is desirable not to make $\Delta p$ too large, to avoid too strong deformation of the substrate; this pushes us in the direction of the larger radii $r_{cap}$. For the numerical example we choose $r_{cap}$=5 $\mu$m. According to Equation 11, this corresponds to the pressure of 2 atm.

Returning to the issue of the cavitation touched upon the previous section, one can also note that the ram pressure generated in the liquid, $\rho v^2$, is small compared to the capillary pressure (12) and cannot contribute to the cavitation. Indeed, the maximum liquid velocity is ~2$\pi$b/t$_{piston}$ and, in for the aforementioned set of the numerical parameters is ~60 cm/s, yielding the maximum ram pressure of a mere 0.04 atm.

The maximum displacement $\Delta b$ of the substrate occurs in its center. Displacement amplitude is:

$$\Delta b = \frac{3(1-\mu^2)R^4 \Delta p}{16 b^3 E}, \quad \text{(Equation 13)}$$

where R is the mirror radius, E is the Young's modulus, and $\mu$ is the Poisson coefficient of the substrate. To make an upper-bound estimate of $\Delta b$, we assume that E is 10 times less than the Young's modulus for the steel, i.e., we take $E=2\cdot 10^{10}$ n/m$^2$. With regard to $\mu$, we take a value of 0.3, typical for many materials. Assuming, as before, that R=0.5 cm, and b=0.1 cm, we find that $\Delta b \sim 1$ $\mu$m, the value that looks acceptable.

The characteristic frequency of the lowest mode of elastic vibrations of the substrate is:

$$\omega \sim \sqrt{\frac{b^2 E}{R^4 \rho}}, \quad \text{(Equation 14)}$$

where $\rho$ is the substrate density. Taking $\rho=2$ g/cm$^3$, and the other parameters as before, one finds that the resonant frequency is $\sim 10^5$ s$^{-1}$. The presence of a heavy underlying liquid reduces this frequency by a factor of a few, leaving it still orders of magnitude higher than the frequency of the piston motion. This justifies using a steady-state approximation in evaluating $\Delta b$.

Rough estimates of displacement and of the lowest eigenfrequency for a rectangular membrane can be obtained by replacing R in Equations 13 and 14 by $(2L_1^{-2}+2L_2^{-2})^{-\frac{1}{2}}$, where $L_1$ and $L_2$ are the lengths of the sides of the rectangle.

An additional force on the membrane will appear because of the viscous friction of the working liquid against the walls of the capillaries. It is assumed that liquid inside capillaries performs a vertical sinusoidal motion with the period $t_{piston}$ and the amplitude b/2 (the distance between the upper and the lower position of the surface is then equal to the thickness of the substrate). This motion is driven by the piston. The amplitude of the viscous friction force between the walls and the liquid can be estimated as $2\pi^2 b^2 \nu \rho / t_{piston}$. The number of capillaries per unit surface area of the substrate is $\eta/\pi r_{cap}^2$, where $\eta$ ($\sim 1$) is a filling factor by which we mean the ratio of the area occupied by the holes to the total area of the substrate. Multiplying the two quantities, one finds additional pressure required to press the liquid through capillaries:

$$\Delta p_{visc} = \frac{2\pi \eta b^2 \nu \rho}{r_{cap}^2 t_{pist}}. \quad \text{(Equation 15)}$$

For mercury, and $\eta=0.5$, $r_{cap}=5$ $\mu$m, b=1 mm, and $t_{pist}=0.01$ s one finds that $\Delta p_{visc} \sim 0.35$ atm and can be neglected compared to the pressure perturbation (12).

Two caveats are in order here. First, the real motion of the piston will probably be not a pure sinusoid. It might be worth adding a "plateau" on the dependence of the piston position vs time around the point where the thickness of the liquid film has reached a desired value. This would eliminate any unnecessary motions that could distort the surface of the film around the time when the optical pulse arrives. For the period of 0.01 s this plateau could probably be 0.002 s long. However, the presence of this relatively short plateau will have no significant effect on the estimate of the force (15). The second caveat is related to the fact that, when making estimate (15), it is implicitly assumed that the liquid flow in the capillary is a pure Poiseuille flow. In fact, the presence of the free surface of the liquid leads to a more complex 2D flow near the surface. We neglect this subtlety in our estimates because of a very large $b/r_{cap}$ ratio.

5 The Waviness of the Reflecting Surface

The substrate is made of many capillaries closely packed together. It is assumed that the walls of the capillaries have a thickness of the order of $r_{cap}$ ($\eta \sim 1$), the spatial scale of the surface structures can be estimated as $r_{cap}$. When the liquid is pressed through the capillaries, its surface gets rippled at this scale or, in other words, the ripples have a characteristic wave number $k \sim 1/r_{cap}$. These ripples experience a rapid viscous damping described by Equation. (7). For mercury and $r_{cap}=5$ microns one has Im$\omega \sim 10^4$ s$^{-1}$; in other words, these perturbations damp away during a small fraction of the in-out period. Generally speaking, initial perturbations will have a broad spectrum where also longer wavelengths will be present. Specific details of the spectrum will be determined by possible larger-scale correlations between positions of individual capillaries. These correlations will depend on the manufacturing process and are unknown to us at this stage. One can only say that even perturbations with spatial scales $\sim 10$ $r_{cap}$ decay relatively quickly, within $\sim 10^{-2}$ s.

A special class is formed by long-wave perturbations with $k<k^*$, which are unstable for the upside-down orientation. The finite radius of the mirror limits wave number of perturbations from below, by the value approximately equal to $$k_{min}=1.5/R \quad \text{(Equation 16)}$$

(the exact numerical coefficient depends on the boundary conditions on the rim). For mercury, and R=0.5 cm, the unstable mode is indeed present ($k_{min}<k^*$). However, it grows very slowly because of the viscous effects. Indeed, Equation (10) shows that for a 25 $\mu$m thick mercury film, and k=3 cm$^{-1}$, the growth rate is $6\cdot 10^{-2}$ s$^{-1}$. The corresponding e-folding time is 15 s, much longer than the period of the piston motion. For a rectangular mirror with the lengths of the sides equal to $L_1$ and $L_2$, under the assumption that displacement is zero on the boundaries, the minimum wave number is $$k_{min} = \pi \sqrt{\frac{1}{L_1^2}+\frac{1}{L_2^2}} \quad \text{(Equation 17)}$$

Although the instability by itself is not a big problem (because of its small growth rate), the absence of the restoring force for the perturbations with $k<k^*$ means that at the large scales the film must be perfect during the whole time of its creation, with tilts or bumps with a scale $k<k^*$ being inadmissible. This means that the properties of the porous substrate must be uniform to a high level of precision at these scales.

As the long-wavelength instability is so slow, it is not a limiting factor in the increase of the size of the mirror. The uniformity of the substrate at larger scales may pose more serious problems.

Figure 5:
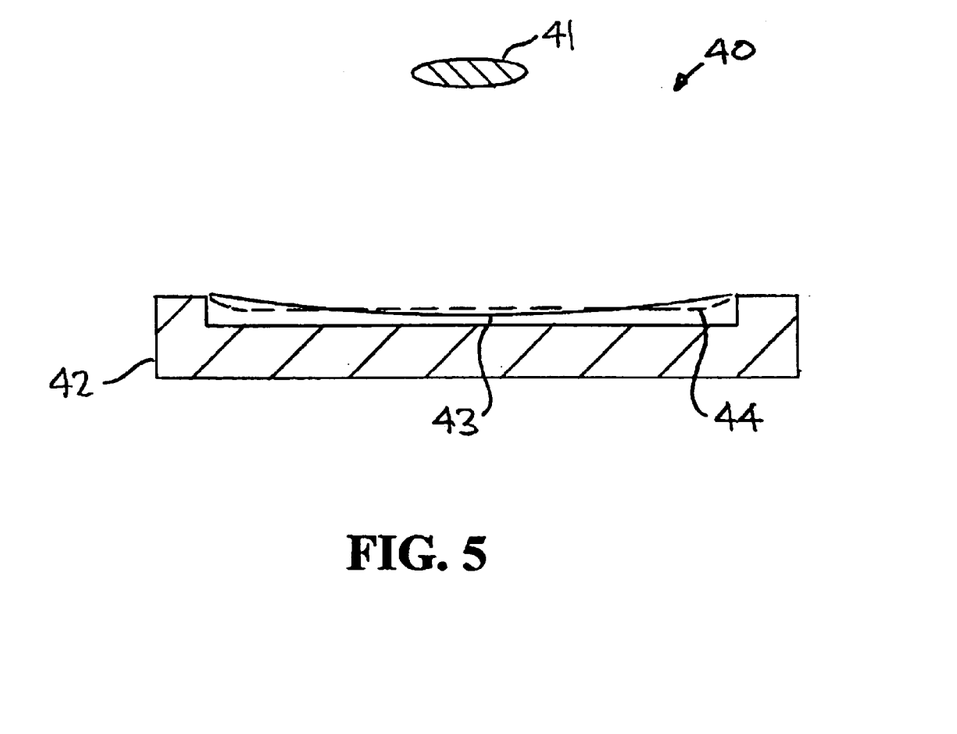
FIG. 5 illustrates creating a quasi-planar mirror by an electrostatic correction of the meniscus.

Conversely, if one wants to have a mirror that would be stable for all perturbations, and whose surface would experience restoring forces bringing the surface to an equilibrium shape (thereby relaxing requirements to the quality of the substrate), one might want to reduce its radius R to the values below, roughly speaking, $1.5/k^*$ (3 mm for mercury). The problem is that the equilibrium shape for a small mirror will not be planar, but will be a meniscus. Referring now to FIG. 5, the making of a quasiplanar mirror in this case by introducing correcting electrostatic forces is illustrated. A quasiplanar mirror is formed near the center of the meniscus. An electric field is created between the correcting electrode 41 and the liquid mirror 43. The solid line 43 depicts initial surface of the meniscus; dashed line 44 shows a corrected surface, after the voltage is applied; this corrected surface 44 is nearly planar near the axis. A supporting structure 42 supports the liquid. A supporting structure 42 operatively retains the liquid 44. The supporting structure 44 may comprise a penetrable unit. The minimum possible level of deviations of the mirror surface from planarity in the stable domain is determined by thermal fluctuations. The spectral energy density $W_k$ of thermal fluctuations is defined by the equation:

$$dW = W_k dk_x dk_y \quad \text{(Equation 18)}$$

where dW is the energy of surface oscillations in the interval of wave numbers $dk_x$, $dk_y$ per unit surface area of the plane. For thermal fluctuations, one has $$W_k = \frac{\kappa_B T}{(2\pi)^2} \quad \text{(Equation 19)}$$

(the Rayleigh-Jeans distribution, with T and $k_B$ being the temperature of the film and the Boltzmann constant, respectively). On the other hand, $W_k$ is related to the spectral density of surface displacements $(\xi^2)_k$ via equation:

$$W_k = \frac{(\xi^2)_k \omega_k^2 \rho}{k} \cdot \frac{\sinh(2kh)}{\cosh(2kh)-1} = (\xi^2)_k (\rho g + \alpha k^2) \quad \text{(Equation 20)}$$

(we have used dispersion relation (1)). Equations (19)–(20) then yield the following expression for the contribution d• of the interval $dk_x$, $dk_y$ to the mean-square deviation of the surface from the plane:

$$d\xi^2 \equiv (\xi^2)_k dk_x dk_y = \frac{\kappa_B T}{(2\pi)^2 (\rho g + \alpha k^2)} \cdot dk_x dk_y \quad \text{(Equation 21)}$$

Remarkably, this result coincides with the previously derived expression for $d\xi^2$ for the liquid of an infinite depth. For capillary waves (i.e., the waves with k>k*, Equation (2)), one obtains:

$$d\xi^2 \equiv \frac{\kappa_B T dk}{2\pi k \alpha} \quad \text{(Equation 22)}$$

We have taken into account that $dk_x dk_y = 2\pi k dk$. The contribution to the surface roughness from the wave numbers whose absolute values lie between $k_1$ and $k_2$ is:

$$\xi^2(k_1 < k < k_2) = \frac{\kappa_B T}{2\pi \alpha} \ln\left(\frac{k_2}{k_1}\right) \quad \text{(Equation 23)}$$

The longer wavelengths, k<k*, give smaller contribution. One sees that for a rough estimate of the r.m.s. value for deviations from planarity one can use an equation $$\sqrt{\langle \xi^2 \rangle} \approx \sqrt{\frac{5\kappa_B T}{2\pi \alpha}} \quad \text{(Equation 24)}$$

where we have replaced the logarithmic factor by its typical numerical value ~5. For mercury at the temperature ~300° K., one has $\sqrt{\xi^2}$~1 Å. This determines the minimum possible surface roughness. The actual roughness may be somewhat larger than (24) because of the finite size of atoms (or molecules) forming the liquid.

The Role of Vibrations

High-precision optical elements installed on an experimental facility usually experience some level of vibrations originating from external sources. There is an issue of possible misalignment caused by these vibrations. For the optical systems a great experience has been accumulated in dealing with this problem. In this sense, solid elements of the system discussed above (e.g., substrates) do not create any specific new problems. A question may arise, though, on how vibrations could affect liquid surfaces.

Typical frequencies of vibrations, $\omega_{vibr}$, lie in the range below 300 s$^{-1}$. They are below the eigenfrequencies of the substrate (Equation 24)). We therefore assume that the substrate moves as a perfectly rigid body. This motion can be represented as a superposition of translational motion and tilts.

Translations are first considered. They are characterize by a displacement vector $\xi(t)$. The translational acceleration $d^2\xi/dt^2$ can be represented as a sum of the tangential and normal acceleration. The normal acceleration does not change the shape of a planar surface of the mirror. So, they are considered tangential acceleration. It causes a liquid flow along the surface of the mirror and leads thereby to tilting of the liquid surface. For relatively low frequencies mentioned above and thin-enough films, the condition $\omega_{vibr}\tau<1$ holds (where $\tau$ is defined as in (8)), meaning that the tangential velocity is a linear function of the distance from the substrate surface (Couette flow), with the average (over the film thickness) velocity equal to $$\bar{v} = \frac{\tau \xi \frac{YY}{t}}{2}, \quad \text{(Equation 25)}$$

where by $\xi_t$ it is meant only tangential component of the displacement. This flow causes increase of the depth on one side of the mirror and decrease on the other side. The estimate for the relative displacement Δh of the liquid surface at two opposite sides of the disk then follows, $$\Delta h \sim \frac{h \omega_{vibr}^2 \xi \tau}{R} \min(\omega_{vibr}^{-1}, \Delta t) \quad \text{(Equation 26)}$$

where Δt is a time interval during which thin film exists at the outer surface of the substrate (0.03 s in the example given). It was deliberately overestimated Δh by writing $\xi$ instead of $\xi_t$.

The tilt of the surface of the film relative to the substrate is Δh/R. In order to be unimportant, it must be less than the tilt of the substrate itself, θ. The latter is related to the displacement by θ~$\xi$/L, where L is the size of the structural element of the facility to which the mirror system is attached, or the wavelength of vibrations in this element, if the latter is shorter. In this way it is possible to arrive at the following criterion for unimportance of specifically "liquid" effects in vibrations:

$$\frac{hL\omega_{vibr}^2 \tau}{R^2} \min(\omega_{vibr}^{-1}, \Delta t) < 1 \qquad \text{(Equation 27)}$$

As already mentioned, for thin-enough films, one has $\omega_{vibr}\tau<1$. This means that condition (27) is certainly satisfied if $hL<R^2$; for our standard set of parameters, R=0.5 cm, h=25 microns, this latter inequality holds if L<100 cm.

The normal component of the acceleration does not affect the planar surface of the liquid film but it may affect the curved surface of the type we discuss in the next section. It is also worth noting that tilts of the substrate cause smaller tilt of the liquid surface relative to substrate than tangential accelerations we have just discussed.

Maximum Intensity of the Laser Pulse

There are two limitations on the intensity of the laser pulse that can still be handled by the system without damaging its permanent components. The first is decrease of the reflectivity during the laser pulse itself (because of, e.g., bringing the surface to a boil temperature during the pulse). The second is possible damage to the substrate by mechanical and thermal perturbations initially produced near the surface of the liquid and then propagating towards the substrate. The first constraint is not specific to the concept. There exist numerous studies of that issue. Therefore only the second constraint is discussed, limited to a qualitative discussion. Consider a 1-dimensional problem, assuming that the spot size on the surface of the film is greater than the film thickness.

There are two characteristic times important in the problem, the sound propagation time through the film, h/S (where S is the sound velocity), and the time of a thermal diffusion, $h^2/X$ (where X is thermal diffusivity). For a 25 μm-thick mercury film, the acoustic time is $\sim 2\cdot 10^{-8}$ s, and the thermal conduction time is $\sim 2\cdot 10^4$ s.

The characteristic pulse-width of the x-ray pulse in the LCLS project is in the range of 200–300 fs. As the laser pulse is shorter than the acoustic time, the pressure perturbation created near the surface, propagates as an acoustic pulse (which may become a shock wave, if the amplitude is large enough). The energy deposition occurs at a depth $\Delta h \sim 0.3$ μm in mercury (this is determined by photo-absorption of x rays and subsequent energy transport by keV-range electrons). The liquid within this layer is heated up to some temperature $\Delta T$ virtually instantaneously (compared both to the sound propagation time and the heat conduction time over $\Delta h$). The resulting pressure perturbation $\Delta p_0$ then drives an acoustic pulse propagating towards the substrate. It may form a weak shock by the familiar overtaking process. The shock is formed if the condition $$\Delta p_0 > \rho S^2 \frac{\Delta h}{h} \qquad \text{(Equation 28)}$$

holds. By noting that the pressure perturbation in the isochoric heating can be evaluated as $$\Delta p_0 \sim \rho S^2 \beta \Delta T \qquad \text{(Equation 29)}$$

(where $\mu$ is volumetric thermal expansion coefficient), one finds that the shock is formed if $$\Delta T > \frac{\Delta h}{\beta h} \qquad \text{(Equation 30)}$$

For mercury in the aforementioned example, the shock is formed if $\Delta T>50$ K. This corresponds to the deposited energy $C_p \Delta h \Delta T > 3$ mJ/cm².

If the shock is indeed formed, it weakens during its propagation through the film [9]; the pressure jump at the distance h from the surface decreases to $\Delta p \sim \Delta p_0 \sqrt{(\rho S^2/\Delta p_0)(\Delta h/h)} < \Delta p_0$, the last inequality being a consequence of (28). For the energy deposition in the range of the critical value of 3 mJ/cm², the expected pressure amplitude will be in the range of 3 Kbar, somewhat below the yield strength of good structural materials.

For longer-pulse, higher energy-per-pulse lasers, the favorable regimes of operation are those where the pulse width is larger than the sound propagation time h/S, so that thermal stresses in the heated surface layers increase adiabatically slowly, and do not lead to shock formation. They just cause a quasi-equilibrium thermal expansion of the heated layer, with only small pressure increase in the bulk of the film. If the pulse is shorter than h/S, it is at least desirable to make it longer than $\Delta h/S$. The pressure perturbation in the pressure pulse that will be propagating towards the substrate will then be much less than Equation 29).

Electrostatically Controlled Mirrors

Mirror Focal Length

Figure 6:
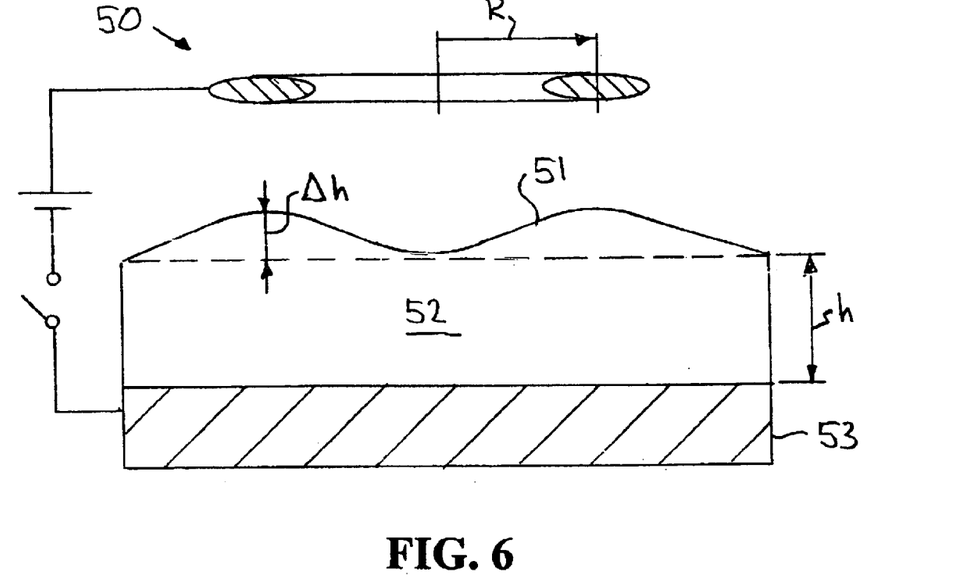
FIG. 6 illustrates creating a focusing mirror by electrostatic forces acting on the surface of a conducting fluid, with a control electrode situated above the mirror surface.

FIG. 6 illustrates creating a focusing mirror by introducing an electrostatic field between the liquid and the ring. In other embodiments more sophisticated sets of electrodes can be used, including electrodes segmented in the azimuthal direction. As shown in FIG. 6, another CAMEL configuration generally designated by the reference numeral 50, is a parabolic mirror 51 in a thin layer of a liquid 52, with a substrate 53 being a flat porous conducting plate. A ring electrode 54 of a radius R will be situated at some distance (~R) over the surface 51. Electric field will distort the surface of the liquid, with the region near the axis forming a parabolic mirror. If a thin ring is situated at a distance a from the surface of the plate, the electric field at the planar surface of the conducting liquid (kept at the ground potential) is determined by the equation $$E_z(r) = \frac{2URa}{\Lambda} \int_0^\pi \frac{d\varphi}{(a^2 + R^2 - 2Rr\cos\varphi + r^2)^{3/2}} \qquad \text{(Equation 31)}$$

where U is the ring potential, and $\Lambda$ is a logarithmic factor depending on the (small) thickness d of the ring $\{\Lambda \sim \ln[2\min(a, R)/d]\}$; r is the distance from the axis of symmetry. Under the action of a ponderomotive force, the surface becomes perturbed. However, these perturbations are small (at least for the mirrors with the focal distance much greater than the mirror radius). We will neglect these small corrections when evaluating $E_z$. If there is a need to refresh the liquid between the two subsequent pulses, one can use a conducting, porous substrate.

For large-focal-length mirrors deviations of the surface from planarity are small, $\Delta h<<R$, and one can use the linear equation to find $\Delta h$:

$$\frac{\alpha}{r}\frac{d}{dr}r\frac{d\Delta h}{dr} = \rho g \Delta h - \frac{E_z^2}{8\pi} \qquad \text{(Equation 32)}$$

We will study its solution near the axis, at small r. In this zone the ponderomotive force can be presented as an expansion:

$$\frac{E_z^2}{8\pi} = \frac{\pi(Ua)^2}{2\Lambda^2(a^2+R^2)^3}\left[1 + C_1\left(\frac{r}{R}\right)^2 + C_2\left(\frac{r}{R}\right)^4 + ...\right] \quad \text{(Equation 33)}$$

We limit ourselves to the first three members. One has:

$$C_1 = \frac{3R^2(3R^2 - 2a^2)}{2(a^2+R^2)^2}; \quad \text{(Equation 34)}$$

$$C_2 = \frac{3R^4\left(4a^4 - 17a^2R^2 - \frac{329}{64}R^4\right)}{2(a^2+R^2)^4}$$

If we are interested in not-too-small mirrors, with the size exceeding 1/k*, one can neglect capillary forces and set the left hand side (l.h.s.) of Equation 32 to zero. Then one obtains the following expression for the function Δh(r):

$$\Delta h(r) = \frac{\pi(Ua)^2}{2\rho g\Lambda^2(a^2+R^2)^3}\left[1 + C_1\left(\frac{r}{R}\right)^2 + C_2\left(\frac{r}{R}\right)^4 + ...\right] \quad \text{(Equation 35)}$$

If corrections related to the finite value of the capillary forces are required, one can find them by substituting this solution to the l.h.s. of Equation 32. The ideal parabolic mirror corresponds to all the terms beyond $r^2$ being equal to zero. The focal length in the paraxial domain, where the third and higher-order terms in the R.H.S. of (35) can be neglected, is $$F = \frac{\rho g\Lambda^2(a^2+R^2)^5}{3\pi(Ua)^2(3R^2-2a^2)} \quad \text{(Equation 36)}$$

At given voltage U and radius R of the ring, the focal length varies as a function of the distance a between the ring and the surface. Assuming that the ring thickness d is small, we neglect a weak logarithmic dependence of Λ vs a) At small a, the surface near the axis is almost flat, and the focal length is infinite. It reaches a minimum at the distance a≈0.45 R. At the further increase of a, the surface near the axis again becomes flat (at a=1.22 R), and then becomes convex, giving rise to a defocusing mirror. The minimum focal length for the defocusing mirror is attained at a≈1.57 R. Finally, at even larger a's, the surface again flattens.

At the distance a≈0.45 R corresponding to the minimum focal length, one has $$F = F_0 \equiv \frac{0.51\rho g\Lambda^2 R^6}{U^2} \quad \text{(Equation 37)}$$

Equation 37 shows that, with mercury as the working liquid, creating a mirror with a focal length of 50 cm by a ring of the radius R=0.5 cm requires a modest voltage ~1.5 kV (we assumed •=3). With this voltage, the maximum value of Δh (which is reached just under the ring, at r≈R) is approximately 30 μm. This sets the minimum value of the initial thickness of the liquid film, which must be greater than ~30 μm. Note that a voltage of 1.5 keV over a gap of ~0.5 cm will not cause a breakdown even for an electrode without special surface treatment.

One advantage of this scheme is that it works not only for conducting but also for dielectric liquid (for the latter, the result analogous to Equation 4.5 will also depend on the dielectric constant). Another advantage is related to a possibility of using several ring electrodes segmented in the azimuthal direction, each with an independent voltage control. By proper adjustment of the voltages applied to azimuthal segments, on can create an approximately parabolic mirror with an axis tilted with respect to the normal to the surface. This demonstrates one outstanding feature of the CAMEL concept: remote control of the focal length and optical axis of a figured mirror, without introducing any mechanically moving parts.

Figure 7:
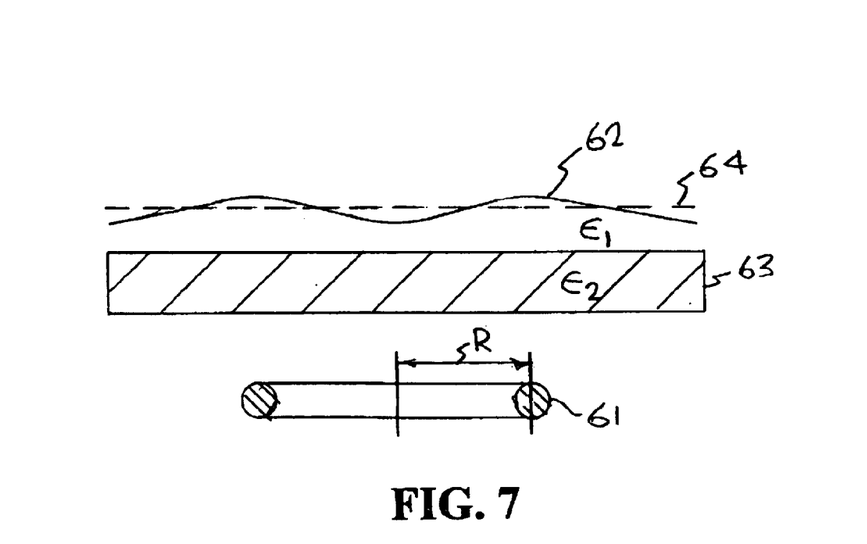
FIG. 7 illustrates creating a focusing mirror by electrostatic forces acting on the surface of a dielectric fluid, with a control electrode situated underneath the solid substrate.

In the aforementioned embodiment, the electrode in front of the mirror limits the solid angle that can be used for collecting light. For dielectric liquids, one can eliminate this constraint by using a ring situated below the liquid film and dielectric substrate. This additional embodiment of a system incorporating the present invention is illustrated in FIG. 7 wherein a ring 61 is situated below the liquid film 62 and dielectric substrate 63. Liquid dielectric with a dielectric constant $\epsilon_1$ is situated above the substrate 63 with a dielectric constant $\epsilon_2$. The unperturbed surface of the liquid is shown by a dashed line 64. After voltage is applied to a ring electrode 61 of a ratio R, the surface becomes distorted and, near the axis, acquires the shape of a focusing mirror. The second electrode is situated far from the ring.

Characteristic Time-Scales for Changing the Shape of the Mirror

Consider a pool of liquid of the thickness h<<R. If one wants to vary the focal length and orientation of the optical axis by varying the voltages at different electrodes, one has to evaluate the characteristic time $\tau_{response}$ within which the liquid will redistribute itself over the surface of the substrate and settle down in the new equilibrium. For thin films, viscous forces may be important and could slow down the response time. Basically, this time is equal to the time of viscous damping of surface waves with the wave-number k~1/R. For not too thick films, the damping rate is determined by Equation 9, with the 1st term neglected (because we assume that k*R>1) According to the estimate (9), we have $$\tau_{response} \sim \frac{2\nu R^2}{h^3 g} \quad \text{(Equation 38)}$$

For a mercury mirror with R=0.5 cm and h=30 μm, one finds $\tau_{response}$~20 s. According to Equation 38, the response is faster for thicker mirrors. At some point, however, the response time evaluated according to Equation 38 becomes shorter than the viscous time (8), and applicability conditions of Equation 9 (or, equivalently, Equation 38) break down. The maximum thickness at which one can still use Equation 38 can be evaluated from the condition $\tau_{reponse}$~τ (with τ as in Equation 8), which yields:

$$h \sim \left(\frac{2\nu^2 R^2}{g}\right)^{1/5} \quad \text{(Equation 39)}$$

The corresponding response time is $$\tau_{response} \sim \left(\frac{4R^4}{g^2\nu}\right)^{1/5} \quad \text{(Equation 40)}$$

For the mercury mirror with R=0.5 cm, one has h=150 m, and the corresponding shortest response time ~0.2 s.

For the film thicker than the one evaluated from Equation 39, the response will be accompanied by excitation of the wave motion of the liquid. One could significantly reduce the amplitude of transient waves by applying the voltage in an "adiabatically slow" fashion. How much one can gain then in terms of the response time, will be analyzed in further reports. Too thick films, on the other hand, may be too vulnerable to vibrations.

Magnetically Controlled Mirrors

Figure 8:
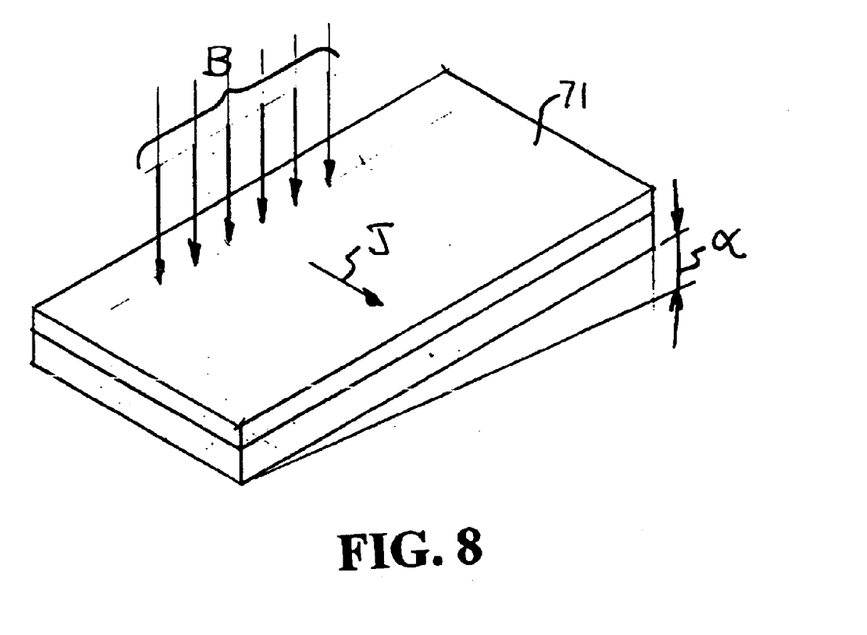
FIG. 8 illustrates the possibility of creating a tilted renewable planar mirror by compensating the gravity force by a j×B force in a conducting fluid.

The j×B force can be used to prevent the liquid from sliding down along the surface of a tilted flat substrate. This may be required, if one needs to create a renewable quasi-steady-state planar mirror. The schematic of a liquid mirror in this case is shown in FIG. 8. The presence of a large permanent magnetic field B normal to the surface 71 allows one to reduce requirements to the current that flows across this field, and thereby make the Joule heating of the film insignificant.

Figure 9:
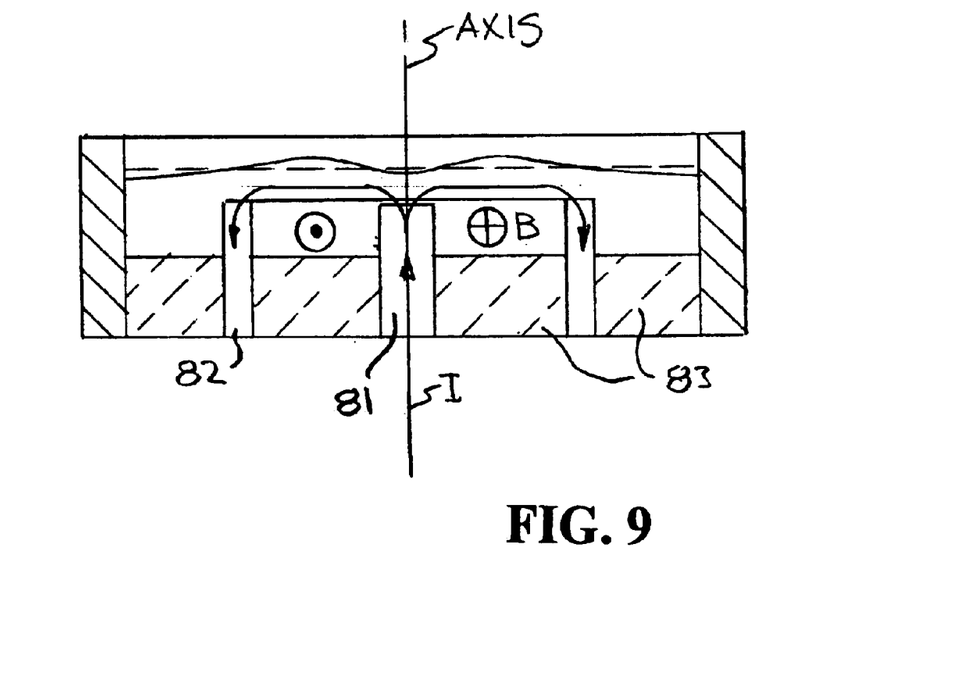
FIG. 9 illustrates another embodiment of a system incorporating the present invention.

The concept illustrated by FIG. 9 can be used to make a small renewable focusing (defocusing) mirror. Two concentric electrodes, electrode 81 and ring electrode 82, are introduced into the liquid film. The substrate 83 is in this case is dielectric and the substrate 83 is a porous substrate as previously described. The radial current flowing between the inner and outer electrodes, generates the azimuthal magnetic field. The j×B force arises which is directed upward and which causes a perturbation of the surface. The working part of the mirror surface will be situated near the axis, where one can create a profile close to a parabolic profile. The magnetic field strength required to produce a 30-$\mu$m variation of the thickness of the film in the mirror of 0.5 cm radius is modest, for the mercury it is ~30 G; this corresponds to a modest current ~100 A.

Description of Additional Embodiments

Figure 10:
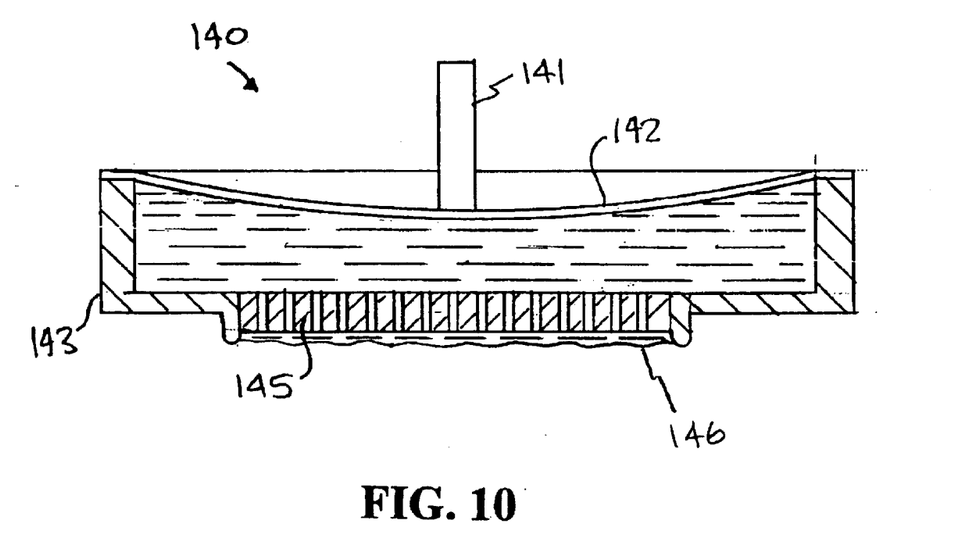
FIG. 10 illustrates an additional embodiment of a system incorporating the present invention.

Referring to FIG. 10, another embodiment of a system incorporating the present invention is illustrated. The system is generally designated by the reference numeral 140. The system 140 provides a planar renewable mirror. An actuator 141 is connected to a flexible membrane 142. The actuator 141 and flexible membrane 142 are carried by mechanical support 143. A liquid fills plenum 144. The reflecting liquid film 1 (5–50 $\mu$m thick) is formed by pressing the working fluid 144 through the porous substrate 145 by the actuator 141 and flexible membrane 142. Before the gravitational instability of the free surface of the liquid has developed, the actuator 141 and flexible membrane 142 sucks the liquid back to the plenum, and the cycle repeats. Specific instability time is determined by the properties of the fluid and the thickness of the film. The free surface of the planar mirror will not suffer from deformations caused by this instability for the time intervals in the range from 0.01 to 0.1 s. The substrate should be —1 mm thick to assure sufficient stiffness against deformations caused by the motion of the liquid through it.

The working liquid shown in FIG. 10 is mercury. In another embodiment of the invention the working liquid is gallium. In other embodiments of the invention the working fluid is composed other materials that provide reflectivity. In other embodiments of the invention the working fluid is composed other materials that provide reflectivity. The working fluid in other embodiments can be conducting liquids including Gallium; NaK alloy (40 to 90% of K). The working fluid in other embodiments can be dielectric liquids including various alcohols, from ethyl alcohol $C_2H_6O$ to benzyl alcohol $C_7H_8O$; glycerin; heavy carbohydrates, like $C_9H_{20}$.

Figure 11:
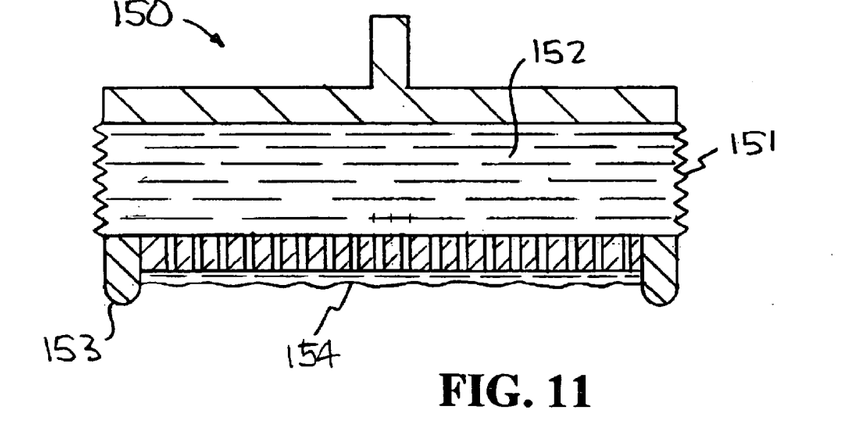
FIG. 11 illustrates an additional embodiment of a system incorporating the present invention.

Another embodiment of the system is shown in FIG. 11. The system is generally designated by the reference numeral 150. The system 150 provides a planar renewable mirror. A bellows 151 is held in place by stiff ring 153. A liquid fills plenum 152. One cycle of the motion of the system will be described. The bellows 151 begins moving the liquid out of the plenum 152. On the reverse motion, the bellows 151 presses the liquid through the capillaries and creates a liquid film with a high-quality reflecting surface.

Figure 12:
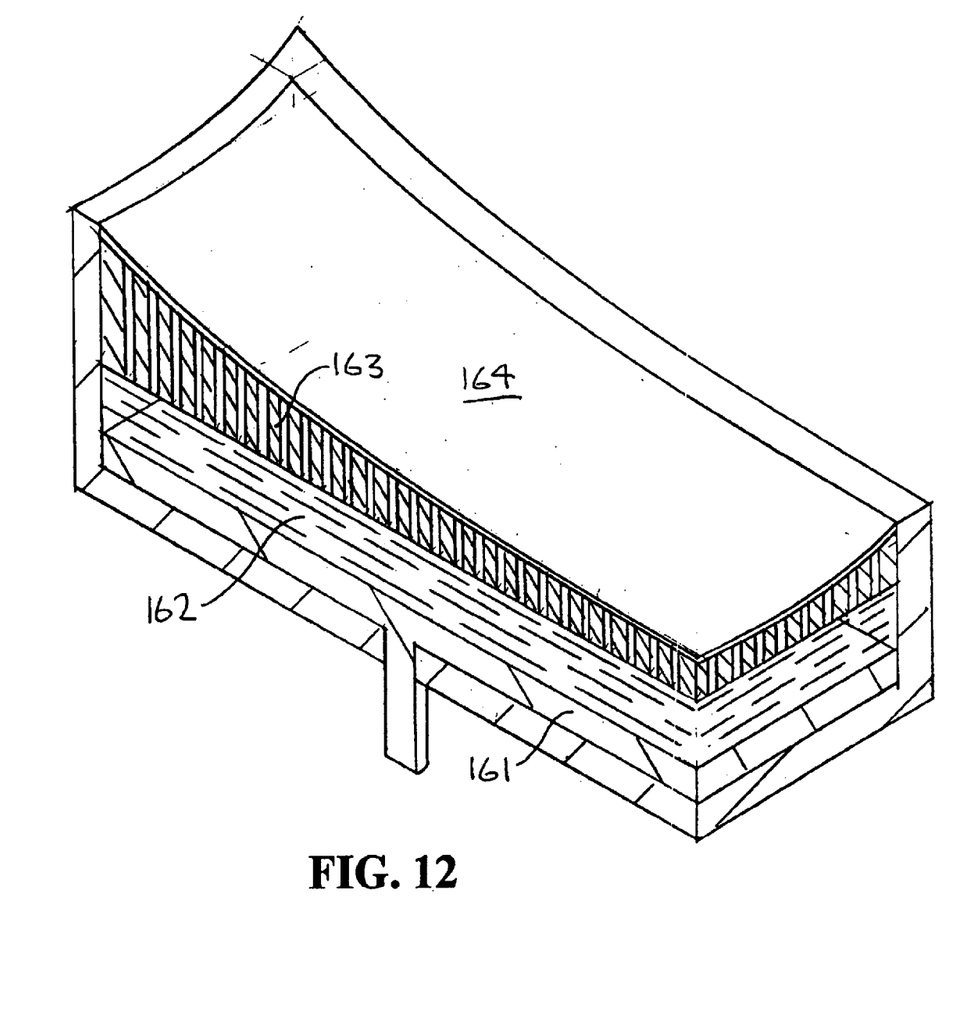
FIG. 12 illustrates creating a shaped renewable liquid mirror by using a shaped substrate.

A modification of this system is a mirror formed over a shaped substrate shown in FIG. 12, which illustrates formation of a curved mirror 164 in a "normal" orientation. The flow of liquid under the action of the gravity force is slow because of viscous friction. In some configurations, if necessary, this flow can be stopped altogether by applying a properly oriented j×B force.

Referring again to FIG. 12, an embodiment of a system incorporating the present invention is illustrated. The system is generally designated by the reference numeral 160. The system 160 provides a contoured renewable mirror. A piston 161 moves the working liquid 162 within a mechanical support. A figured porous substrate 163 is located on the other side of the working liquid 162 from piston 161. In another embodiment the figured porous substrate comprises holes extending entirely through the penetrable unit. In another embodiment the holes are capillary size holes.

One cycle of the motion of the piston 161 will be described starting from the position where the contoured film 164 is present on the outer surface of the figured porous substrate 163. The piston 161 begins moving the away from the substrate 1163 and, by the end of a half-cycle, "sucks" the liquid out of the capillaries behind the substrate 163. On the reverse motion, the piston 161 presses the liquid through the capillaries and creates a contoured liquid film reflecting system with a high-quality reflecting surface.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A renewable mirror, comprising:
    a liquid,
    a penetrable unit, wherein said penetrable unit is a capillary substrate, and
    a system for operatively connecting said liquid to said penetrable unit to provide a mirror that can be universally oriented.

2. The mirror of claim 1, wherein said penetrable unit is a porous unit.

3. The mirror of claim 1, wherein said penetrable unit is a porous substrate.

4. The mirror of claim 1, wherein said penetrable unit is planar.

5. The mirror of claim 1, wherein said penetrable unit is contoured.

6. The mirror of claim 1, wherein said penetrable unit is a figured porous substrate.

7. The mirror of claim 1, wherein said penetrable unit comprises holes extending through said penetrable unit.

8. The mirror of claim 7, wherein said holes are capillary size holes.

9. The mirror of claim 1, wherein said system for operatively connecting said liquid to said penetrable unit to provide a mirror that can be universally oriented includes a system for moving said liquid relative to said penetrable unit so that said liquid is at least partially withdrawn through said penetrable unit and for moving said liquid relative to said penetrable unit so that said liquid again provides a mirror.

10. The mirror of claim 9, wherein said system for operatively connecting said liquid to said penetrable unit to provide a mirror that can be universally oriented is an actuating device for moving said liquid relative to said penetrable unit.

11. The mirror of claim 9, wherein said system for operatively connecting said liquid to said penetrable unit to provide a mirror that can be universally oriented is a piston.

12. The mirror of claim 9, wherein said system for operatively connecting said liquid to said penetrable unit to provide a mirror that can be universally oriented is an actuator and flexible membrane.

13. The mirror of claim 9, wherein said system for operatively connecting said liquid to said penetrable unit to provide a mirror that can be universally oriented is a bellows.

14. The mirror of claim 9, wherein said system for operatively connecting said liquid to said penetrable unit to provide a mirror that can be universally oriented is a source of liquid pressure.

15. The mirror of claim 1, wherein said liquid is a liquid metal.

16. The mirror of claim 1, wherein said liquid is mercury.

17. The mirror of claim 1, wherein said liquid is gallium.

18. The mirror of claim 1, wherein said liquid is a NaK alloy (40 to 90% of K).

19. The mirror of claim 1, wherein said liquid is a conducting liquid.

20. The mirror of claim 1, wherein said liquid is a dielectric liquid.

21. The mirror of claim 1, wherein said liquid is an alcohol.

22. The mirror of claim 1, including electrodes situated over or under said liquid that change the shape of said liquid when a voltage is applied to said electrodes.

23. The mirror of claim 1, wherein said electrodes are ring electrodes.

24. A renewable mirror, comprising:
  liquid means for producing a reflective unit,
  penetrable means, wherein said penetrable means is a capillary substrate, and
  means for operatively connecting said liquid to said penetrable means for providing a mirror that can be universally oriented.

25. The mirror of claim 24, wherein said penetrable means is a porous unit.

26. The mirror of claim 24, wherein said penetrable means is a porous substrate.

27. The mirror of claim 24, wherein said penetrable means is planar.

28. The mirror of claim 24, wherein said penetrable means is contoured.

29. The mirror of claim 24, wherein said penetrable means comprises holes extending through said penetrable means.

30. The mirror of claim 29, wherein said holes are capillary size holes.

31. The mirror of claim 24, wherein said means for operatively connecting said liquid to said penetrable means for providing a mirror includes an actuating device for moving said liquid relative to said penetrable means.

32. The mirror of claim 31, wherein said actuating device includes a piston.

33. The mirror of claim 31, wherein said actuating device includes an actuator and flexible membrane.

34. The mirror of claim 31, wherein said actuating device includes a bellows.

35. The mirror of claim 24, wherein said liquid means is a conducting liquid.

36. The mirror of claim 24, wherein said liquid means is a dielectric liquid.

37. The mirror of claim 24, including electrodes situated at some distance from said liquid means that change the shape of said liquid means when a voltage is applied to said electrodes.

38. The mirror of claim 37, wherein said electrodes are ring electrodes.

39. A method of providing a renewable mirror, comprising
  providing a liquid for producing a reflective unit,
  providing a penetrable unit, wherein said step of providing penetrable unit comprises providing a figured porous substrate, and
  operatively connecting said liquid to said penetrable unit to provide a mirror that can be universally oriented.

40. The method of providing a mirror of claim 39, wherein said step of providing penetrable unit comprises providing a porous substrate.

41. The method of providing a mirror of claim 39, wherein said step of providing penetrable unit comprises providing a planar substrate.

42. The method of providing a mirror of claim 39, wherein said step of providing penetrable unit comprises providing a contoured substrate.

43. The method of providing a mirror of claim 39, including moving said liquid relative to said penetrable unit so said liquid is refreshed.

44. The method of providing a mirror of claim 39, including changing the shape of said liquid by positioning electrodes relative to said liquid and energizing said electrodes.

* * * * *